(12) United States Patent
Muramatsu

(10) Patent No.: US 12,673,374 B2
(45) Date of Patent: Jul. 7, 2026

(54) SPINDLE DEVICE

(71) Applicant: FANUC CORPORATION, Minamitsuru-gun (JP)

(72) Inventor: Toshifumi Muramatsu, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 670 days.

(21) Appl. No.: 17/909,208

(22) PCT Filed: Mar. 4, 2021

(86) PCT No.: PCT/JP2021/008394
§ 371 (c)(1),
(2) Date: Sep. 2, 2022

(87) PCT Pub. No.: WO2021/177399
PCT Pub. Date: Sep. 10, 2021

(65) Prior Publication Data
US 2023/0087832 A1 Mar. 23, 2023

(30) Foreign Application Priority Data
Mar. 5, 2020 (JP) ................................. 2020-037339

(51) Int. Cl.
*B23B 31/26* (2006.01)
*B23B 31/30* (2006.01)

(52) U.S. Cl.
CPC ............ *B23B 31/261* (2013.01); *B23B 31/30* (2013.01); *B23B 2260/128* (2013.01); *B23Q 2220/006* (2013.01)

(58) Field of Classification Search
CPC . B23B 31/261; B23B 31/30; B23B 2260/128; B23B 2270/022; B23Q 2220/006
See application file for complete search history.

(56) References Cited

FOREIGN PATENT DOCUMENTS

| | | |
|---|---|---|
| CN | 1260290 A | 7/2000 |
| CN | 1820400 A | 8/2006 |

(Continued)

OTHER PUBLICATIONS

International Search Report (ISR) (PCT Form PCT/ISA/210), in PCT/JP2021/008394, dated Apr. 13, 2021.
(Continued)

*Primary Examiner* — Sunil K Singh
*Assistant Examiner* — Eric Daniel Whitmire
(74) *Attorney, Agent, or Firm* — Sughrue Mion, PLLC

(57) ABSTRACT

Provided is a spindle device which can inhibit the spreading of the exterior shape of a housing in the radial direction of a shaft. One embodiment relates to a spindle device having a tubular member which is fixed to a housing through which a shaft is inserted, and which extends to outside along the axial direction of the shaft from an end surface of the housing on the other end side of the shaft. The spindle device includes: a holding part which is provided to the end surface of the housing outside of the outer peripheral surface of the tubular member, and which holds a linear member that extends along the axial direction of the shaft and passes inside of the housing; and a cut-out section formed in the outer peripheral surface of the tubular member. At least a portion of the holding part is disposed on the inner side of the cut-out section.

6 Claims, 3 Drawing Sheets

10

(56) References Cited

FOREIGN PATENT DOCUMENTS

| | | | |
|---|---|---|---|
| CN | 203335524 | U | 12/2013 |
| CN | 109420776 | A | 3/2019 |
| JP | H06-047641 | A | 2/1994 |
| JP | 2006-102906 | A | 4/2006 |
| JP | 2008-161952 | A | 7/2008 |
| JP | 2008-279580 | A | 11/2008 |
| JP | 2009-012102 | A | 1/2009 |
| JP | 2013-230552 | A | 11/2013 |
| JP | 2016-111783 | A | 6/2016 |
| JP | 2018-001323 | A | 1/2018 |
| KR | 20-2010-0010464 | U | 10/2010 |
| KR | 10-1713839 | B1 | 3/2017 |

OTHER PUBLICATIONS

Communication dated Mar. 19, 2025 in Chinese Application No. 202180019004.2.

FIG. 3

SPINDLE DEVICE

TECHNICAL FIELD

The present invention relates to a spindle device of a machine tool.

BACKGROUND ART

In a machine tool, a spindle device is used that includes a shaft, a housing through which the shaft is inserted, and a bearing that rotatably supports the shaft with respect to the housing. There are cases where the spindle device may have a mechanism capable of changing a tool according to the type of machine tool or the like.

JP 2018-001323 A discloses a spindle device (automatic tool changer) including a shaft (spindle), a housing (housing body) into which the shaft is inserted, and bearings (front bearing and rear bearing) that rotatably support the shaft with respect to the housing. The spindle device includes a tubular member (cylinder), a slider (unclamping piston), and a clamp portion (collet) as a mechanism capable of changing tools.

The tubular member is fixed to the housing and extends outward along the axial direction of the shaft from an end surface of the housing that is located on the other end side of the shaft. The slider slides in the tube of the tubular member along the axial direction of the shaft. The clamping portion selectively performs clamping and unclamping on a tool inserted into a through hole penetrating the shaft along the axial direction of the shaft in accordance with sliding of the slider.

In the spindle device of JP 2018-001323 A, since a motor for rotating the spindle is provided inside the housing, it is necessary to pass a cable for supplying electric power to the motor, through the inside of the housing. When a cable is passed through the inside of the housing, a cable gland is often used in the field of machine tools (see, for example, JP 2016-111783 A).

SUMMARY OF THE INVENTION

When the cable is passed through the housing disclosed in JP 2018-001323 A from a side to which the tubular member is fixed, it is necessary to provide a cable gland outside the outer peripheral surface of the tubular member. Therefore, the outer shape of the housing in the radial direction of the shaft tends to increase in size.

Therefore, an object of the present invention is to provide a spindle device capable of preventing an outer shape of a housing from increasing in size in a radial direction of a shaft.

An aspect of the present invention resides in a spindle device including: a shaft; a housing through which the shaft is inserted; a bearing configured to rotatably support the shaft with respect to the housing; a tubular member fixed to the housing and extending outward along an axial direction of the shaft from an end surface of the housing that is located on another end side of the shaft; a slider configured to slide inside a tube of the tubular member along the axial direction of the shaft; and a clamping unit configured to selectively perform clamping and unclamping on a tool inserted into a through hole penetrating the shaft along the axial direction of the shaft, in accordance with sliding of the slider, wherein the spindle device further includes: a holding portion provided on the end surface of the housing outside an outer peripheral surface of the tubular member and extending along the axial direction of the shaft, the holding portion being configured to hold a line-shaped member passing through an inside of the housing; and a cutout portion formed in the outer peripheral surface of the tubular member, and wherein at least part of the holding portion is disposed inside the cutout portion.

According to the present invention, since at least part of the holding portion is disposed on the inside of the cutout portion, it is possible to prevent the outer shape of the housing from increasing in size in the radial direction of the shaft.

BRIEF DESCRIPTION OF DRAWINGS

FIG. 3 is a perspective view showing the drive unit side of FIG. 1.

DESCRIPTION OF THE INVENTION

The present invention will be detailed hereinbelow by describing a preferred embodiment with reference to the accompanying drawings.

Embodiment

Figure 1:
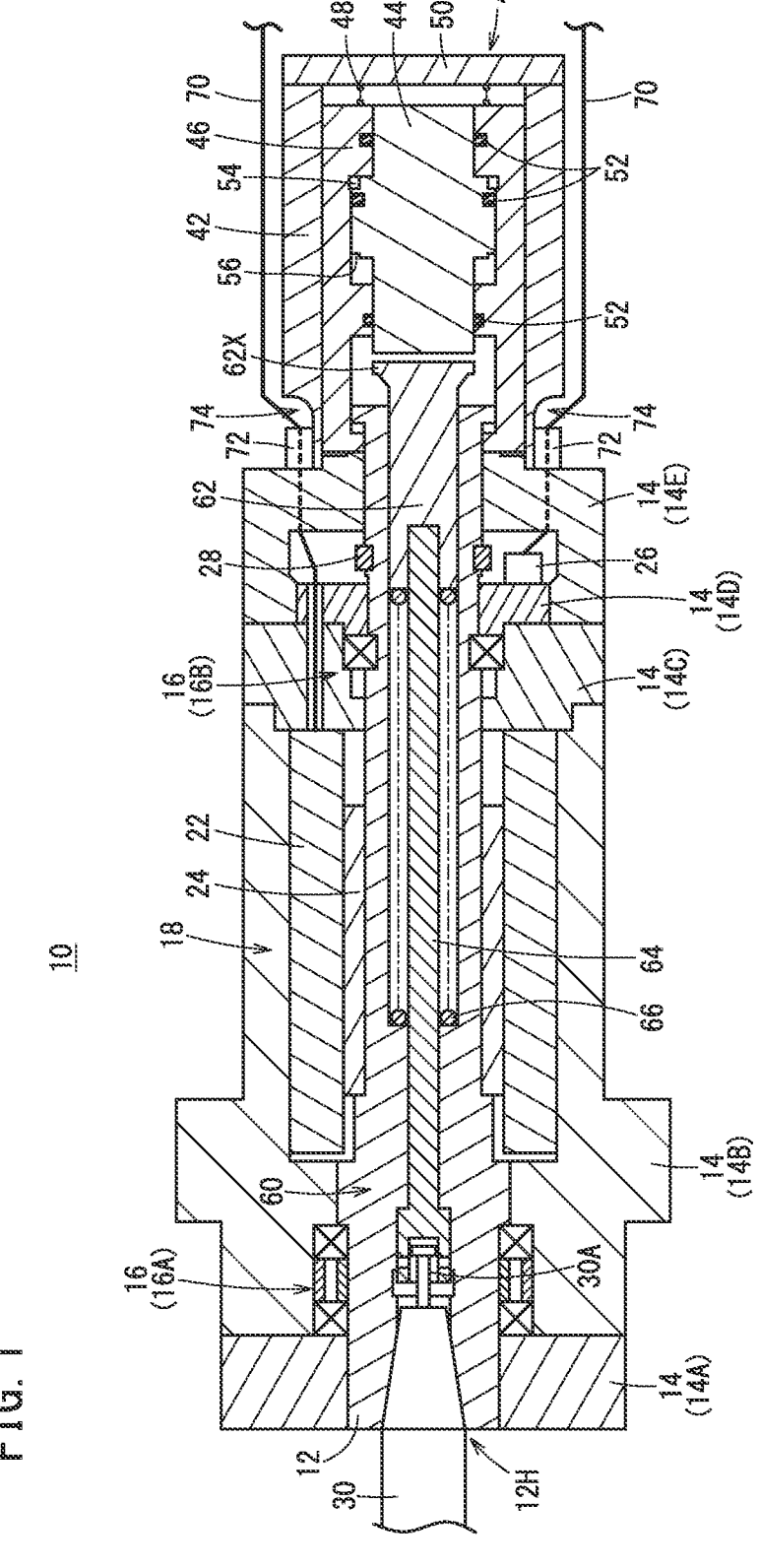
FIG. 1 is a cross-sectional view showing a spindle device of the present embodiment.

A spindle device 10 according to the present embodiment will be described with reference to FIG. 1. The spindle device 10 includes a shaft 12, a housing 14, and a bearing 16.

The shaft 12 serves as a center of rotation. The shaft 12 is rotated by power of a motor 18 provided inside the housing 14. The motor 18 includes a stator 22 attached to an inner peripheral side of the housing 14, and a rotor 24 inserted through the stator 22 and fixed to an outer peripheral surface of the shaft 12. In the shaft 12, a through hole 12H penetrating the shaft 12 from one end surface (front surface) to the other end surface (rear surface) of the shaft 12 is formed along an extending direction (axial direction) of the shaft 12.

The housing 14 is a box-shaped body having a hole through which the shaft 12 is inserted. The housing 14 is divided into a plurality of housing pieces 14A, 14B, 14C, 14D, and 14E, and is formed by assembling each of the housing pieces 14A, 14B, 14C, 14D, and 14E. A rotation sensor 26 that detects the rotational speed of the shaft 12 is provided on the inner peripheral surface of the housing 14 (housing piece 14D). The rotation sensor 26 detects the rotational speed of the shaft 12 based on a rotation detection gear 28 provided on the outer peripheral surface of the shaft 12.

The bearing 16 rotatably supports the shaft 12 with respect to the housing 14. An inner ring of the bearing 16 is fixed to an outer peripheral surface of the shaft 12, and an outer ring of the bearing 16 is fixed to an inner peripheral surface of the housing 14. The bearing 16 may have a first bearing 16A that supports one end side (front side) of the shaft 12 and a second bearing 16B that supports the other end side (rear side) of the shaft 12. When the bearing 16 have the first bearing 16A and the second bearing 16B, the number of the first bearings 16A and the number of the second bearings 16B may be singular or plural. FIG. 1 illustrates the bearing 16 having two first bearings 16A and one second bearing 16B as an example.

In the present embodiment, the spindle device 10 includes a drive unit 40 and a clamping unit 60 as a mechanism capable of changing a tool 30.

The clamping unit 60 selectively performs clamping and unclamping on the tool 30 inserted into the through hole 12H of the shaft 12 along the axial direction of the shaft 12, in accordance with driving of the drive unit 40. The clamping unit 60 includes a force receiving rod 62, a chuck 64, and an urging portion 66.

The force receiving rod 62 is a rod that is pressed by the drive unit 40, and is provided on the other end (rear end) side of the shaft 12 so as to be slidable in the through hole 12H of the shaft 12. A locking portion 62X is formed at an end portion of the force receiving rod 62 that is exposed from the through hole 12H of the shaft 12. The locking portion 62X comes into contact with the other end surface (rear end surface) of the shaft 12, to thereby suppress the entire force receiving rod 62 from being inserted into the through hole 12H of the shaft 12.

The chuck 64 is disposed in the through hole 12H of the shaft 12. An end portion of the chuck 64 on the other end (rear end) side of the shaft 12 is attached to an end portion of the force receiving rod 62 that is opposite to the end portion of the force receiving rod 62 exposed from the through hole 12H of the shaft 12. When the force receiving rod 62 is not pressed by the drive unit 40, the end portion of the chuck 64 on the one end (front end) side of the shaft 12 clamps the pull stud 30A of the tool 30 inserted into the through hole 12H from the one end surface (front surface) of the shaft 12. On the other hand, when the force receiving rod 62 is pressed by the drive unit 40, the end portion of the chuck 64 on the one end (front end) side of the shaft 12 unclamps the pull stud 30A of the tool 30.

The urging portion 66 is disposed in the through hole 12H of the shaft 12, and urges the force receiving rod 62 from one end (front end) toward the other end (rear end) of the shaft 12. The urging portion 66 is a spring member such as a coil spring, a disc spring, etc. The urging portion 66 is provided in a compressed state between the inner peripheral surface of the shaft 12 and an end surface of the force receiving rod 62 that is opposite to the end surface of the force receiving rod 62 exposed from the through hole 12H of the shaft 12.

The drive unit 40 drives the clamping unit 60 so as to clamp the pull stud 30A of the tool 30 inserted into the through hole 12H from one end surface (front surface) of the shaft 12 and unclamp the clamped pull stud 30A. Here, the drive unit 40 will be described with reference to FIG. 2.

The drive unit 40 includes a tubular member 42 that is fixed to the housing 14 and extends outward along the axial direction of the shaft 12 from an end surface 14F of the housing 14 that is located on the other end side (rear side) of the shaft 12. A slider 44 and a support member 46 that supports the slider 44 so that the slider 44 can slide inside the tube of the tubular member 42 along the axial direction of the shaft 12 are provided inside the tubular member 42.

The slider 44 is formed in a rod shape extending along the axial direction of the shaft 12. An end portion of the slider 44 on the shaft 12 side faces and is separated from the end portion of the force receiving rod 62 exposed from the through hole 12H of the shaft 12. The slider 44 is provided with a protrusion 44X between both ends thereof in a direction in which the slider 44 extends. The protrusion 44X has an outer diameter larger than an outer diameter of a portion of the slider 44 other than the protrusion 44X, and protrudes outward beyond the portion.

The support member 46 is formed in a tubular shape having a hole through which the slider 44 is inserted. The support member 46 may be divided into a plurality of pieces and may be formed into a tubular shape by assembling the pieces. A first locking portion 46X and a second locking portion 46Y for locking the protrusion 44X of the slider 44 are formed on the inner peripheral surface of the support member 46. The first locking portion 46X is located farther from the end surface 14F of the housing 14, and the second locking portion 46Y is located closer to the end surface 14F of the housing 14. The protrusion 44X of the slider 44 is disposed between the first locking portion 46X and the second locking portion 46Y. The slider 44 slides along the axial direction of the shaft 12 between a first position where the protrusion 44X is in contact with the first locking portion 46X and a second position where the protrusion 44X is in contact with the second locking portion 46Y.

The support member 46 may be fixed to the housing 14 or may be provided to be movable along the axial direction of the shaft 12. In the present embodiment, it is assumed that the support member 46 is movably provided. When the support member 46 is movably provided, the support member 46 is provided with a projection 46Z extending inward from an end portion on the end surface 14F side of the housing 14, and a locking portion 12X for locking the projection 46Z is formed at the other end portion of the shaft 12 exposed from the housing 14. The locking portion 12X may be a flange of the shaft 12 extending in the radial direction of the shaft 12. The support member 46 moves along the axial direction of the shaft 12 between a position where the projection 46Z comes into contact with the locking portion 12X of the shaft 12 and a position where the projection 46Z comes into contact with the end surface 14F of the housing 14.

In the case where the support member 46 is movably provided, the support member 46 is urged toward the end surface 14F of the housing 14 by an urging portion 48. The urging portion 48 is a spring member such as a coil spring, a disc spring, etc. The urging portion 48 is provided in a compressed state between the support member 46 and a cover portion 50 that closes the opening of the tubular member 42 on the side opposite to the end surface 14F side of the housing 14.

Three seal members 52 are provided at intervals in the axial direction of the shaft 12 between the slider 44 and the support member 46, and a first hydraulic chamber 54 and a second hydraulic chamber 56 are formed between the seal members 52. When causing the clamping unit 60 to perform unclamping, high-pressure oil is supplied to the first hydraulic chamber 54. When causing the clamping unit 60 to perform clamping, high-pressure oil is supplied to the second hydraulic chamber 56.

When high-pressure oil is supplied to the first hydraulic chamber 54, the support member 46 moves toward the second direction opposite to the first direction of approaching the end surface 14F of the housing 14, and then stops at the position where the projection 46Z of the support member 46 comes into contact with the locking portion 12X of the shaft 12. In this case, the slider 44 slides toward the first direction to press the force receiving rod 62, and then stops at the second position where the protrusion 44X comes into contact with the second locking portion 46Y. Thus, the unclamped state of the clamping unit 60 is maintained.

On the other hand, when high-pressure oil is supplied to the second hydraulic chamber 56, the support member 46 moves in the first direction and stops at the position where the projection 46Z of the support member 46 comes into contact with the end surface 14F of the housing 14. In this case, the slider 44 slides in the second direction and stops at the first position where the protrusion 44X comes into contact with the first locking portion 46X. Accordingly, the clamped state of the clamping unit 60 is maintained. Since the slider 44 is urged in the second direction by the urging portion 66 via the force receiving rod 62 of the clamping unit 60, the slider 44 continues stopping at the first position even when the supply of the high-pressure oil to the second hydraulic chamber 56 is stopped.

In the spindle device 10 of the present embodiment, a line-shaped member 70 penetrates through the housing 14. The line-shaped member 70 may be a cable or the like. The line-shaped member 70 may be a member through which a fluid flows or a member through which a drive current is supplied. The number of the line-shaped members 70 may be one or more.

When the line-shaped member 70 is a member through which a fluid flows, the line-shaped member 70 has a flow path that allows the fluid to flow therethrough. Examples of the fluid include a lubrication oil for the bearing 16, a compressed air for sealing a gap between the shaft 12 and the housing 14, and the like. When the line-shaped member 70 is a member through which a drive current is supplied, the line-shaped member 70 includes an electric wire for supplying the drive current. The electric wire is connected to, for example, the motor 18 or the rotation sensor 26. When a temperature sensor that detects the temperature of the motor 18 is provided, the electric wire may be connected to the temperature sensor.

Figure 3:
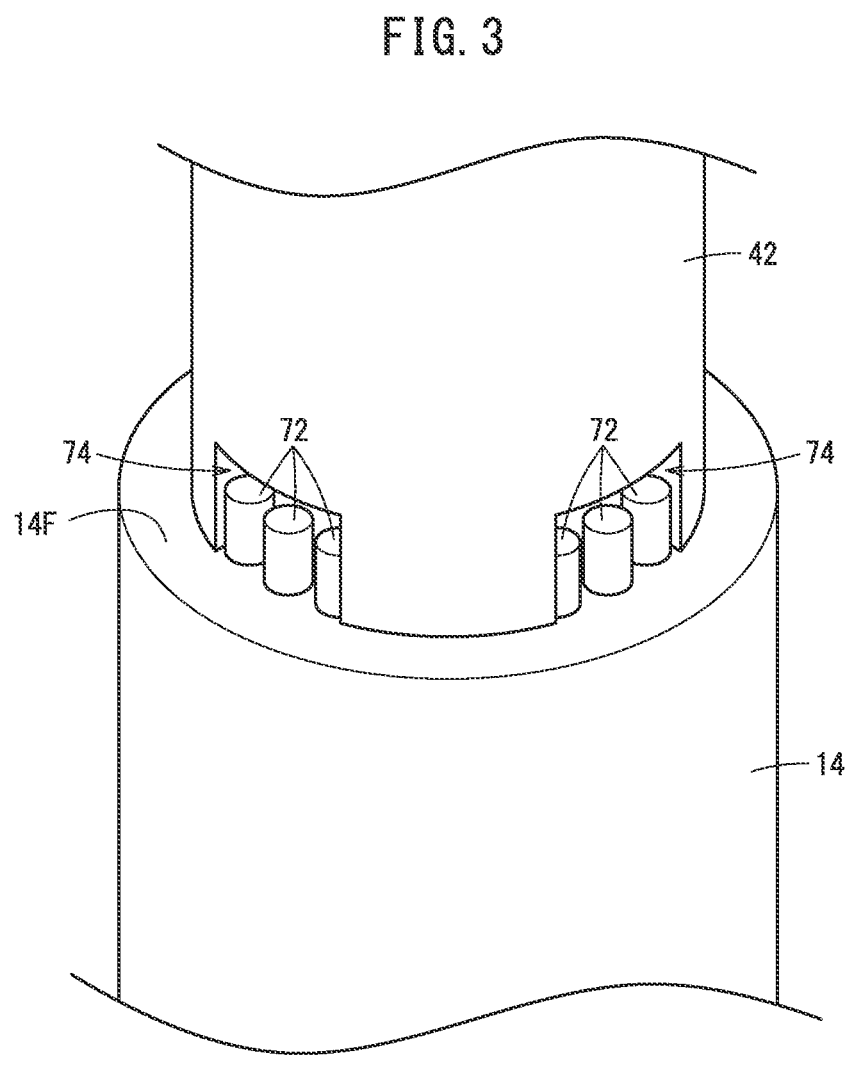

In the present embodiment, the line-shaped member 70 for supplying the drive current to the motor 18 and the line-shaped member 70 for supplying the drive current to the rotation sensor 26 penetrate through the housing 14. FIG. 3 is a perspective view showing the drive unit 40 side of FIG. 1. In FIG. 3, the line-shaped members 70 are omitted.

A holding portion 72 for holding the line-shaped member 70 is provided on the end surface 14F of the housing 14 outside the outer peripheral surface of the tubular member 42. The number of the holding portions 72 may be one or more. Note that the number of the holding portions 72 may be the same as or different from the number of the line-shaped members 70 passing through the housing 14. That is, the holding portion 72 may be provided on the end surface 14F of the housing 14 in a state where the line-shaped member 70 is not held.

The holding portion 72 extends along the axial direction of the shaft 12 and has an insertion hole through which the line-shaped member 70 is inserted. The insertion hole of the holding portion 72 is connected to a communication hole of the housing 14 which is opened on the end surface 14F of the housing 14. The communication hole of the housing 14 is a hole that penetrates the housing 14 and allows the inside and the outside of the housing 14 to communicate with each other. The holding portion 72 holds the line-shaped member 70 inserted into the insertion hole, along the axial direction of the shaft 12, and seals a gap between the line-shaped member 70 and the housing 14.

A cutout portion 74 is formed on the outer peripheral surface of the tubular member 42. The cutout portion 74 is formed by cutting out the outer peripheral surface of the end portion of the tubular member 42 on the end surface 14F side of the housing 14. A plurality of cutout portions 74 may be formed at intervals in the circumferential direction of the tubular member 42, or may be formed in the entire circumferential direction of the tubular member 42. FIG. 3 shows a case in which a plurality of cutout portions 74 are formed at intervals in the circumferential direction of the tubular member 42.

Figure 2:
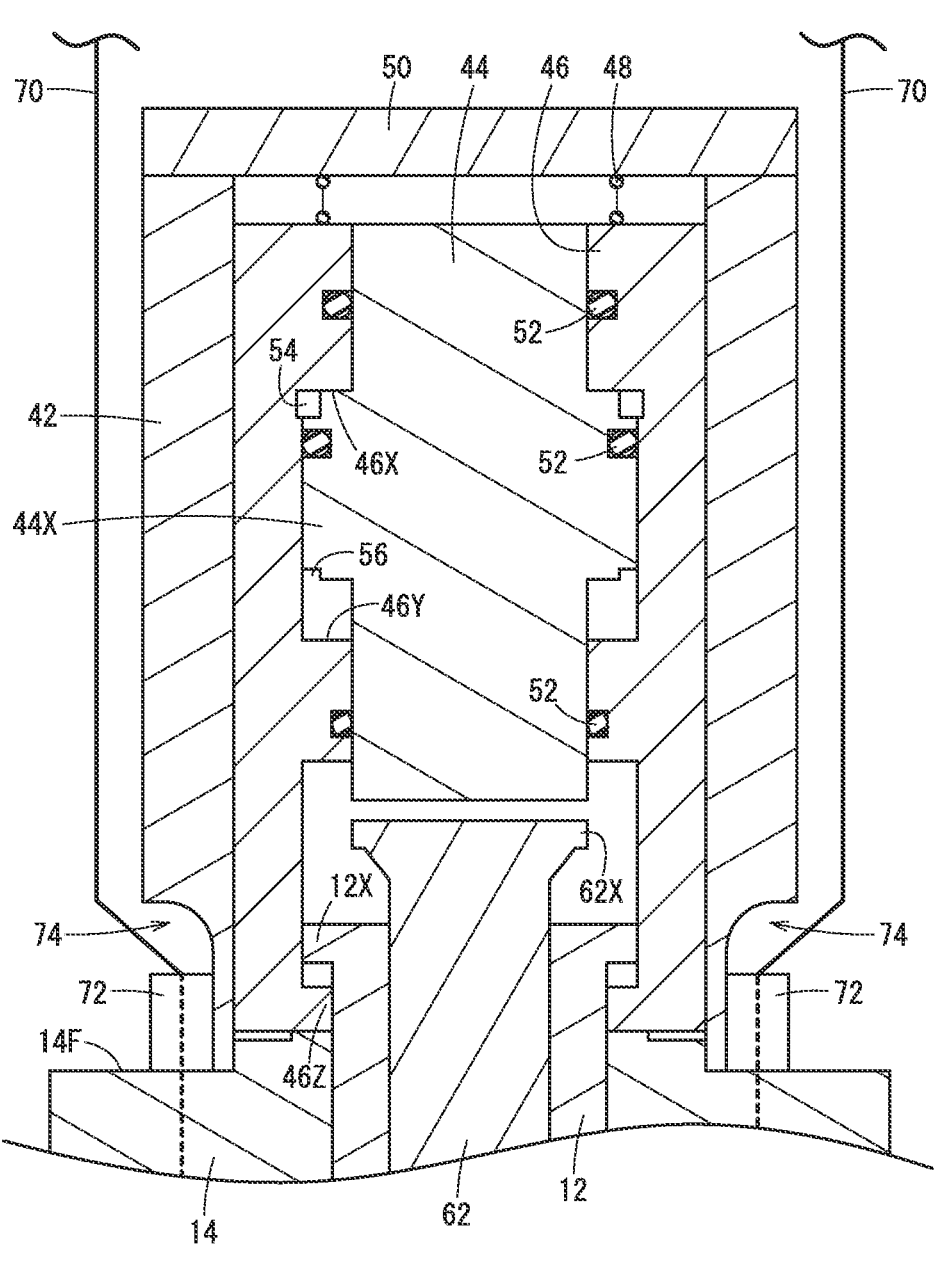
FIG. 2 is a cross-sectional view showing a drive unit side of FIG. 1.

At least part of the holding portion 72 is disposed inside the cutout portion 74. Accordingly, in the present embodiment, it is possible to prevent the outer shape of the housing 14 from increasing in size in the radial direction of the shaft 12. Note that FIGS. 1 to 3 illustrate a case in which the entire holding portion 72 is disposed inside the cutout portion 74. In a case where the entire holding portion 72 is disposed on the inside of the cutout portion 74, it is possible to further prevent the outer shape of the housing 14 from increasing in size in the radial direction of the shaft 12, compared to a case where part of the holding portion 72 is disposed on the inside of the cutout portion 74.

In a case where the plurality of holding portions 72 are provided on the end surface 14F of the housing 14, at least part of each of the plurality of holding portions 72 is disposed inside the cutout portion 74. When the plurality of cutout portions 74 are formed at intervals in the circumferential direction of the tubular member 42, or when the cutout portions 74 are formed over the entire circumferential direction of the tubular member 42, the number of the holding portions 72 disposed inside the cutout portions 74 can be increased, compared to a case where one cutout portion 74 is formed in a portion of the circumferential direction of the tubular member 42.

Invention

The invention that can be understood from the above embodiment will be described below.

According to the present invention, there is provided a spindle device (10) including: a shaft (12); a housing (14) through which the shaft (12) is inserted; a bearing (16) configured to rotatably support the shaft (12) with respect to the housing (14); a tubular member (42) fixed to the housing (14) and extending outward along an axial direction of the shaft (12) from an end surface (14F) of the housing (14) that is located on another end side of the shaft (12); a slider (44) configured to slide inside a tube of the tubular member (42) along the axial direction of the shaft (12); and a clamping unit (60) configured to selectively perform clamping and unclamping on a tool (30) inserted into a through hole (12H) penetrating the shaft (12) along the axial direction of the shaft (12), in accordance with sliding of the slider (44). The spindle device (10) further includes: a holding portion (72) provided on the end surface (14F) of the housing (14) outside an outer peripheral surface of the tubular member (42) and extending along the axial direction of the shaft (12), the holding portion (72) being configured to hold a line-shaped member (70) passing through an inside of the housing (14); and a cutout portion (74) formed in the outer peripheral surface of the tubular member (42). At least part of the holding portion (72) is disposed inside the cutout portion (74).

According to the spindle device (10) of the present invention, since at least a part of the holding portion (72) is disposed inside the cutout portion (74), it is possible to prevent the outer shape of the housing (14) from increasing in size in the radial direction of the shaft (12).

The entire holding portion (72) may be disposed inside the cutout portion (74). Thus, the outer shape of the housing (14) can be further prevented from increasing in size in the radial direction of the shaft (12) as compared with the case where a part of the holding portion (72) is disposed inside the cutout portion (74).

The cutout portion may be made up of a plurality of cutout portions (74) that are formed at intervals in the circumferential direction of the tubular member (42). Thus, the number of the holding portions (72) disposed inside the cutout portion (74) can be increased as compared with a case where one cutout portion (74) is formed in a part of the circumferential direction of the tubular member (42).

The line-shaped member (70) may allow a fluid to flow therethrough. This allows fluid to flow into the housing (14) or allows the fluid that has flowed into the housing to flow out of the housing (14).

The line-shaped member (70) may allow a drive current to be supplied therethrough. This makes it possible to drive electronic components such as a motor (18) provided inside the housing (14).

The line-shaped member (70) is connected to at least one of a motor (18) provided inside the housing (14), a rotation sensor (26) for detecting the rotational speed of the motor (18), or a temperature sensor for detecting the temperature of the motor (18). This makes it possible to drive the motor (18), the rotation sensor (26), or the temperature sensor to which the line-shaped member (70) is connected.

The invention claimed is:

1. A spindle device comprising:
   a shaft;
   a housing through which the shaft is inserted;
   a bearing configured to rotatably support the shaft with respect to the housing;
   a tubular member fixed to the housing and extending outward along an axial direction of the shaft from an end surface of the housing that is located on another end side of the shaft;
   a slider configured to slide inside a tube of the tubular member along the axial direction of the shaft; and
   a clamping unit configured to selectively perform clamping and unclamping on a tool inserted into a through hole penetrating the shaft along the axial direction of the shaft, in accordance with sliding of the slider,
wherein the spindle device further comprises:
a holding portion provided on the end surface of the housing outside an outer peripheral surface of the tubular member and extending along the axial direction of the shaft, the holding portion being configured to hold a line-shaped member passing through an inside of the housing; and
a cutout portion formed in the outer peripheral surface by reducing a thickness of the outer peripheral surface of the tubular member in part, and
wherein at least part of the holding portion is disposed inside a space formed by the cutout portion.

2. The spindle device according to claim 1, wherein
an entirety of the holding portion is disposed inside the cutout portion.

3. The spindle device according to claim 1, wherein
the cutout portion comprises a plurality of cutout portions that are formed at intervals in a circumferential direction of the tubular member.

4. The spindle device according to claim 1, wherein
the line-shaped member is configured to allow a fluid to flow therethrough.

5. The spindle device according to claim 1, wherein
the line-shaped member is configured to allow a drive current to be supplied therethrough.

6. The spindle device according to claim 5, wherein
the line-shaped member is connected to at least one of a motor provided inside the housing, or a rotation sensor configured to detect a rotational speed of the motor.

\* \* \* \* \*